Aug. 20, 1935.  C. HALL, JR  2,012,003
ATTACHMENT FOR OPERATING GATE VALVES BY MEANS
OF FLUID PRESSURE FROM ANY DESIRED DISTANCE
Original Filed July 22, 1932  2 Sheets-Sheet 1
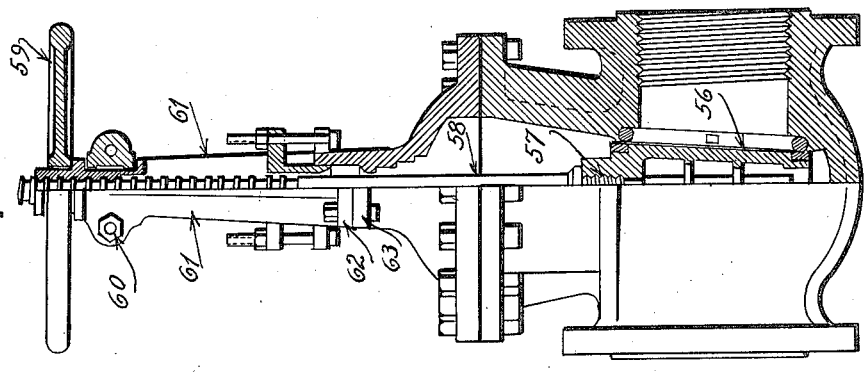
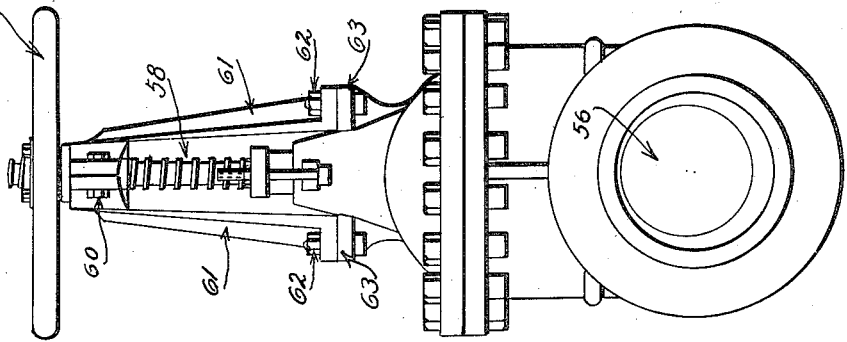
Inventor
C. Hall, Jr.
By Marts & Clark
Attorneys Aug. 20, 1935.  C. HALL, JR  2,012,003
ATTACHMENT FOR OPERATING GATE VALVES BY MEANS
OF FLUID PRESSURE FROM ANY DESIRED DISTANCE
Original Filed July 22, 1932   2 Sheets-Sheet 2

Inventor
C. Hall, Jr
By Marks Clerk
Attorneys

Patented Aug. 20, 1935

2,012,003

UNITED STATES PATENT OFFICE 2,012,003

ATTACHMENT FOR OPERATING GATE VALVES BY MEANS OF FLUID PRESSURE FROM ANY DESIRED DISTANCE

Carlos Hall, Jr., Mexico D. F., Mexico

Original application July 22, 1932, Serial No. 624,127. Divided and this application July 26, 1934, Serial No. 737,130. In Mexico June 23, 1932

2 Claims. (Cl. 137—139)

This invention refers to an attachment for opening and closing gate valves by means of pressure of water, air, steam, gas or any other fluid element from any desired distance or by hand.

This invention is a division of my copending application 624,127 filed July 22, 1932, now Patent No. 1,977,554, dated October 16, 1934.

The attachment according to the present invention is illustrated in the accompanying drawings, in which the same numbers of reference refer to the same parts in all the figures.

It is the primary object of this invention to provide an attachment of the type mentioned particularly adapted for use on "rising stem valves."

Fig. 1 is front view of an ordinary "rising stem" valve.

Fig. 2 is a vertical semi-sectional view of the same valve seen from the side.

Figure 5:
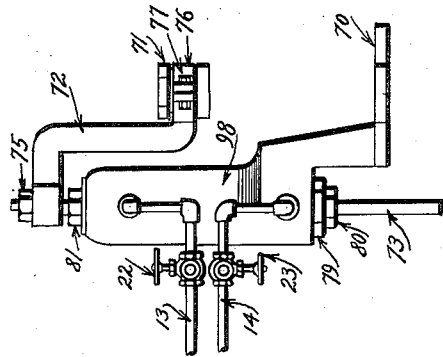
Fig. 5 is a complete view of an attachment with only one cylinder for "rising stem" valves.

The following is a description of the mechanism and operation of the different attachments mentioned in the foregoing.

In order to better understand the operation of this attachment, in the following the so called "rising stem" valve will be briefly described, with reference to Figs. 1 and 2 which show such a valve of standard construction.

This valve consists of a gate (56) which is fixed in its upper part by means of thread (57) to the stem (58) of the valve. The ascending and descending movements of this stem are effected by the hand wheel (59) and the gate (56) follows said stem in its movements thus closing or opening the valve. This is different from the "non rising stem" valve in which the stem is firmly secured to the body of the valve and only the gate ascends and descends on said stem to open or close the valve.

In order to provide a valve of the "rising stem" type with the attachment for distant control by fluid pressure, the following has to be done:

From the standard valve as shown in Figs. 1 and 2 are removed the screw and nut (60) which hold together the braces (61), the screws and nuts (62) which secure the braces to the rims (63) of the valve, the braces (61) and the hand wheel (59), leaving the stem (58) entirely free.

Figure 4:
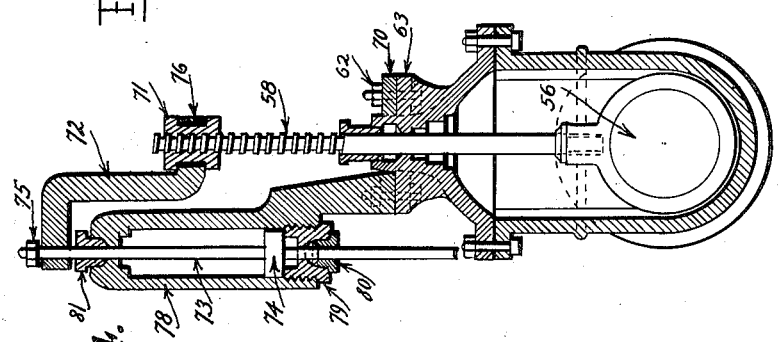
Fig. 4 shows a vertical cross section of the same attachment and valve.
Figure 3:
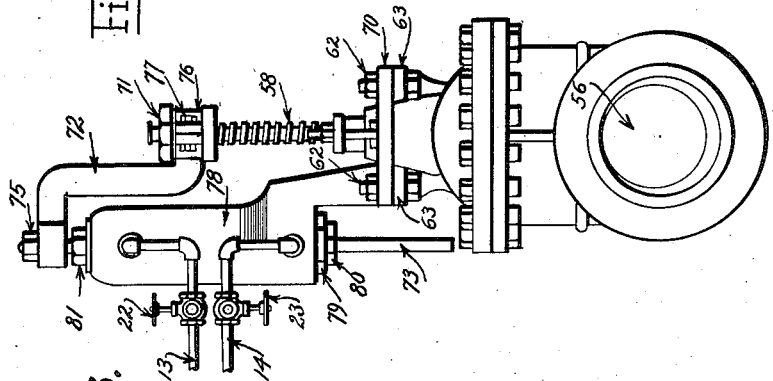
Fig. 3 is a complete view of an attachment with only one cylinder, connected to a "rising stem" valve.

Once this has been done, the attachment shown in Figs. 3, 4 and 5 is placed in the following manner:

The base (70) is mounted on the rims (63) of the valve and secured by means of the screws and nuts (62). Thereafter the bent arm (72) is fixed to the upper part of the stem (73) of the plunger (74) by means of the nut (75). At the same time the block (71) which has interior thread and which serves for opening and closing the valve by hand, is screwed on, connecting the brace (76) by means of the screws and nuts (77).

The attachment works in the following manner: when pressure is applied through the pipe (13) the plunger (74) will descend and close the gate (56) of the valve by means of the stem (73), the bent arm (72), the block (71), the brace (76) and the stem (58) of the valve carrying the gate (56).

The attachment, as may be seen in Figs. 3, 4 and 5 is composed of the following pieces: The principal body is formed by the cylinder (78) and the base (70). The lower mouth of the cylinder is hermetically closed by the plug (79) which serves as a stuffing box for the gland (80). Inside the cylinder (78) is the stem (74) which operates the attachment by means of fluid pressure. The stem (73) passes through the centre of the plunger (74) and is packed at the upper part of the cylinder by means of the stuffing box (81) and at the lower part of the cylinder by the plug (79) and gland (80).

To open and close the valve by hand the following has to be done: fluid pressure is applied through the pipe (13) until the plunger (74) has descended completely, or in other words, until the gate (56) of the valve is in a completely closed position. Thereafter the block or spool (71) is turned by means of a wrench, and as this block has in its centre a thread which corresponds to the thread on the stem (58) of the valve, it will open or close the gate (56).

Having thus described the invention, what I claim is:

1. A distant operating attachment for standard gate valves of the type having a body, a gate, a bonnet and a stem operating through the bonnet comprising an attaching and supporting base detachably mounted on the bonnet of the valve, a single cylinder carried with said base laterally of the stem and parallel thereto, a piston operating in the cylinder, a piston rod connected to the piston and opening through the cylinder, a laterally extending and bent arm connecting the upper projecting end of the piston rod with the upper end of the stem of the valve, and hand operable means for operating the valve stem interposed between the stem and the arm.

2. An attachment for converting standard hand operated gate valves of the "rising stem" type into gate valves of remote control by fluid pressure which comprises a cylinder detachably mounted on the bonnet of the valve by means of an integral lateral base, a piston operating within said cylinder by fluid pressure, a piston rod connected to said piston and operating through the cylinder, a bent arm having one end connected firmly to the upper end of the piston rod and the other end connected to the upper end of the valve stem by means of a spool with interior thread which serves for operating the valve by hand.

CARLOS HALL, Jr.